Figure 2:
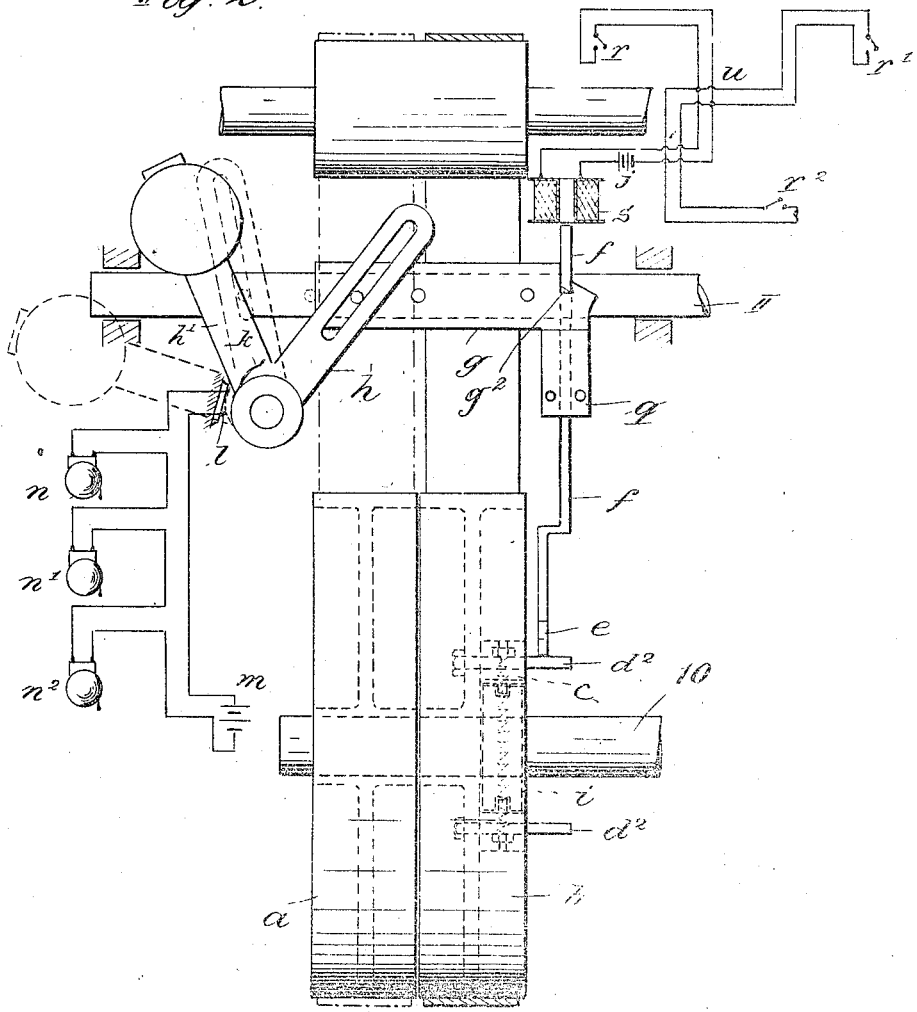

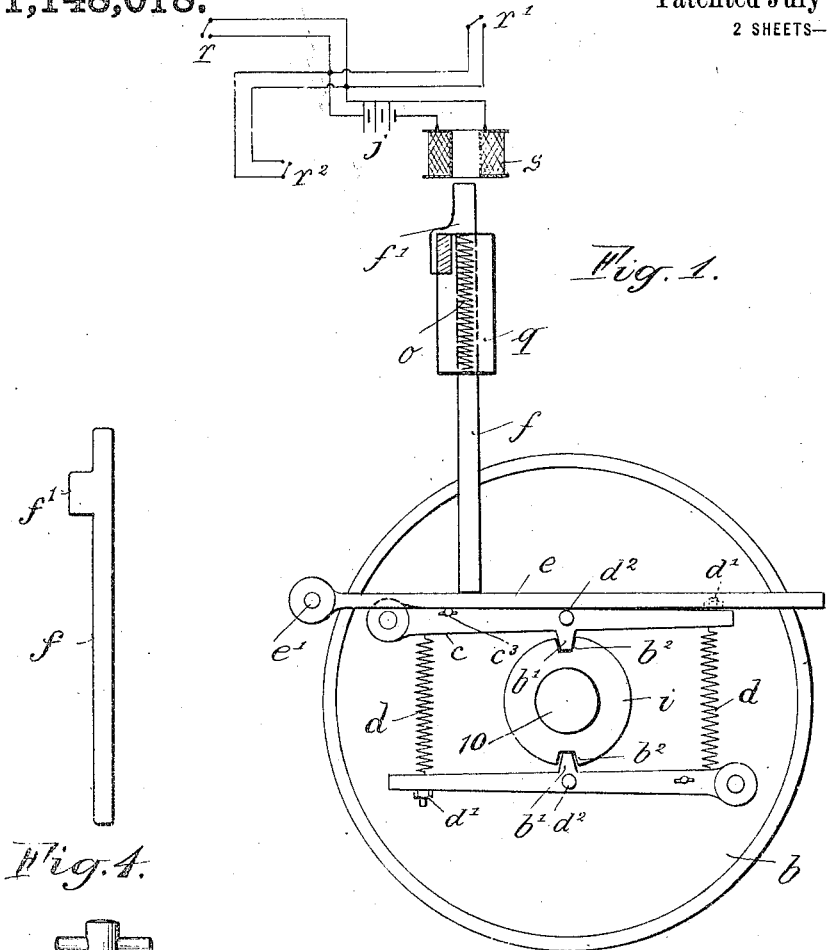
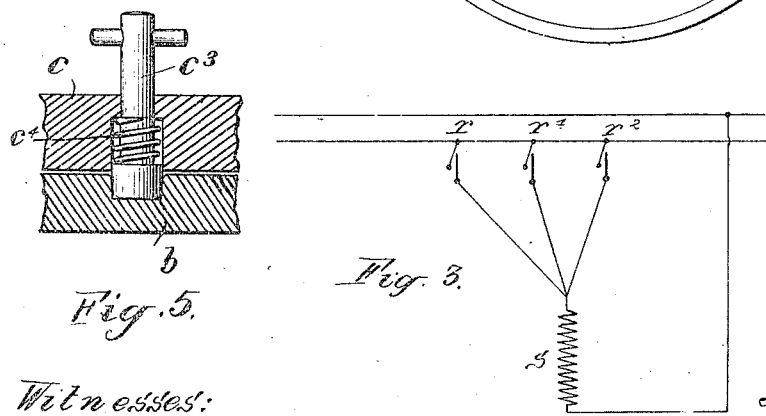

C. W. F. HANSEN.
AUTOMATIC DISENGAGING DEVICE FOR BELT PULLEYS.
APPLICATION FILED JUNE 10, 1913.

1,148,018.

Patented July 27, 1915.

ID FO
UNITED STATES PATENT OFFICE.

CHRISTOPH W. F. HANSEN, OF FLENSBURG, GERMANY.

AUTOMATIC DISENGAGING DEVICE FOR BELT-PULLEYS.

1,148,018.

Specification of Letters Patent.   Patented July 27, 1915.

Application filed June 10, 1913.   Serial No. 772,899.

*To all whom it may concern:*

Be it known that I, CHRISTOPH WILHELM FERDINAND HANSEN, a subject of the Emperor of Germany, residing at Flensburg, Germany, have invented certain new and useful Improvements in Automatic Disengaging Devices for Belt-Pulleys, of which the following is a specification.

The present invention relates to a disengaging device for belt pulleys, and comprises a clutch device actuated by overload, which uncouples the driving pulley automatically from the drive shaft and at the same time shifts the belt from the driving pulley to an idle pulley, the shifting device operating to release one or more electric signal devices suitably located to indicate that the machine is running idle. By means of this invention it is also possible to shift the belt from the driving pulley to the idle pulley at will from a given location.

With this disengaging device any damage to the driving mechanism or the working machine is rendered impossible and very reliable working assured. For example, when the working machine is overloaded or there are extraordinary resistances in the driving gear, the driving pulley is automatically uncoupled from the shaft and its belt at the same time is thrown out of action. Further, in the case of unforeseen circumstances, for example, the belt of the driving pulley can be thrown out of engagement at any time as desired from any distant place.

One embodiment of the invention is shown in the accompanying drawing, in which—

Figure 1 is a side elevation of the driving pulley, with the clutch device, the electromagnetic belt shifting device, and the switch arrangements; Fig. 2 is a front elevation of the belt shifting device with the electromagnet and the signaling device; Fig. 3 shows diagrammatically an example of the switch arrangement for the disengaging device connected with an electric circuit; Fig. 4 is a detail elevation of a lock bar employed according to the invention; Fig. 5 is a transverse section of one of the locking devices for a clutch member.

Referring more specifically to said drawing $a$ indicates the idle pulley which rotates loosely upon the shaft 10, and $b$ indicates the driving pulley which is also freely journaled on the shaft 10. An annular disk $i$ is fixed on shaft 10, adjacent to the driving pulley $b$, and has two diagonally opposite flared recesses $b^2$, which receive the projections $b^1$ of two pawls $c$, which are pivotally fixed to the center or web of the driving pulley $b$. The free ends of pawls $c$ are oppositely disposed and each drawn toward the pivoted end of the other, so as to hold their projections $b^1$ within the recesses $b^2$, by means of springs $d$. By means of nuts $d^1$, which regulate the tension of springs $d$, the pressure of the projections $b^1$ against the flared sides of the recesses $b^2$ in the annular disk $i$ can be regulated.

Each pawl $c$ is further provided with a pin $c^3$ which bears normally against the web or center of driving pulley $b$ by reason of a spring $c^4$ (shown in Fig. 5). When the pawls $c$ are removed from the annular disk $i$, the pins $c^3$ are pressed by their springs $c^4$ into corresponding recesses in the web of the driving pulley $b$, and are there firmly held so that the pulley remains out of engagement with the annular disk $i$, and the driving pulley $b$ which is now uncoupled from the annular disk $i$ can then rotate freely on the shaft 10. Each of the pawls $c$ has a pin $d^2$ which is so arranged that upon movement of the pawls outward, the pins will engage an arm $e$ which is pivoted outside the pulley $b$ at a fixed point $e^1$. Immediately above this arm $e$ is a lock bar $f$ (see Figs. 1, 2 and 4) which may be raised by arm $e$. Lock bar $f$ engages by means of a beveled nose $f^1$ in an opening $g^2$ of a sleeve $g$ which slides on a bar 11 and carries a belt fork. The slide $g$ is thereby held firmly in normal position by the lock bar $f$. A sufficiently powerful electromagnet coil is securely fixed immediately above the lock bar $f$ and connected with a source of current $j$ by means of conductors in which one or more switch devices are inserted at suitable places for energizing the electromagnet $s$ when it is desired to withdraw the lock bar $f$ from sleeve $g$ to release the belt shifting mechanism as will be described. The lock bar $f$ is normally held in its lower position (locking the sleeve $g$) by means of a spring $o$. A bell crank lever, having a slotted arm $h$ and a weighted arm $h^1$ engages a pin on sleeve $g$ and tends, by reason of its weighted arm $h$, to throw the sleeve $g$ to the left in Fig. 2 and thereby shift the belt from work pulley $b$ to idle pulley $a$. The lock bar $f$ normally prevents this actuation of the slide $g$. It will thus be apparent that the lock bar *f* controls the shifting of the belt, and the lock bar in turn is actuated by the magnet *s* or the clutch mechanism of pulley *b* and shaft 10. On the arm *h¹* of the bell crank lever a contact spring *k* is arranged. When the lever *h, h¹* is moved to the left, that is to say, when the belt is shifted to idle position, this spring comes in contact with a contact *l* and thereby connects the source of curent *m* and operates signal devices such as bells *n, n¹, n²*. Thus as long as the belt remains on the idle pulley, the signal bells *n, n¹, n²* will continue to indicate the fact that the belt is running idle.

The operation of the device is as follow: When an overload occurs, the projections *b¹* of pawls *c* are forced out of the flared recesses *b²*, thereby freeing pulley *b* from shaft 10 and causing the engagement of pins *d²* with arm *e*. Rotation of the pawls *c* with the pulley *b* thus effects the raising of arm *e* and lock bar *f* to release the slide *g*. The weighted bell crank lever is thereupon free to shift the belt from the driving pulley to idle pulley *a*. Signal bells *n, n¹, n²* announce the fact that the belt is then running idle. For throwing the machine out of operation under manual control, as upon the occurrence of accident or emergency, one of the switches *r* is closed, thereby energizing magnet *s* and thus withdrawing lock bar *f* from sleeve *g* and releasing the belt shift as already described. Referring again to the automatic throwout, the pawls *c* in moving outwardly bring the pins *c³* into registration with the recesses in the center or web of belt pulley *b* whereupon their springs *c⁴* press the pins into the recesses to lock the pawls against falling back into the recesses *b²*. Thus the pawls are held firmly so that the pins *d²* can positively raise the arm *e*. By withdrawing locking pins *c³*, the pawls are again released and their projections *b¹* returned to the recesses *b²*. The driving pulley is thereby again connected with the drive shaft 10 for transmitting power.

In place of battery *j* it is obvious that any suitable conductors or line wires may be employed for energizing magnet coil *s*, as illustrated, for example, in Fig. 3, in which the several switches are in parallel to each other and each of them is in series with the magnet coil.

I claim:

1. A mechanical stop motion comprising in combination a shaft to be driven, a belt pulley loosely associated therewith, means for clutching said belt pulley to said shaft to be driven, a drive belt for said belt pulley, means for shifting the drive belt from said belt pulley, means for locking said shifting means, and clutching mechanism adapted to operatively connect said belt pulley with said shaft to be driven, up to a predetermined limit of load and means operated by disengagement of said clutch mechanism to free said belt shifting means from said locking means.

2. A mechanical stop motion, comprising in combination a shaft to be driven, a notched disk thereon, a belt pulley loosely associated with said shaft, a pawl pivoted to the face of said belt pulley having a projection adapted to engage the notch of said disk, means for holding said projection in engagement with said notch up to a predetermined load, a belt shifter, a belt controlled thereby for driving said belt pulley, a lock for preventing actuation of said belt shifter and means operated by said pawl for disengaging said belt shifter from said locking means.

In testimony whereof I affix my signature in presence of two witnesses.

CHRISTOPH W. F. HANSEN.

Witnesses:
  KARL FRIEDRICH FUNTZEL,
  WALTER ROHDE.